(12) United States Patent
Battiato

(10) Patent No.: US 10,099,544 B2
(45) Date of Patent: Oct. 16, 2018

(54) TAILGATE SEAL FOR A PICKUP WITH A TRUCK CAP OR COVER

(71) Applicant: Victor J Battiato, Carol Stream, IL (US)

(72) Inventor: Victor J Battiato, Carol Stream, IL (US)

( * ) Notice: Subject to any disclaimer, the term of this patent is extended or adjusted under 35 U.S.C. 154(b) by 0 days.

(21) Appl. No.: 15/598,276

(22) Filed: May 17, 2017

(65) Prior Publication Data

US 2017/0253112 A1 Sep. 7, 2017

Related U.S. Application Data

(63) Continuation-in-part of application No. 14/705,839, filed on May 6, 2015.

(60) Provisional application No. 61/992,898, filed on May 14, 2014.

(51) Int. Cl.
*B60J 10/84* (2016.01)
*B60J 10/34* (2016.01)
*B60J 10/80* (2016.01)
*B60J 10/24* (2016.01)

(52) U.S. Cl.
CPC ............. *B60J 10/84* (2016.02); *B60J 10/24* (2016.02); *B60J 10/34* (2016.02); *B60J 10/80* (2016.02)

(58) Field of Classification Search
CPC .... B60J 10/0031; B60J 10/0071; B60J 10/08; B60J 10/0054; B60J 10/24; B60J 10/80; B60J 10/84; B60J 10/248; B60J 10/34; B60J 10/45; B60R 13/06; Y10S 277/921
See application file for complete search history.

(56) References Cited

U.S. PATENT DOCUMENTS

| | | | | |
|---|---|---|---|---|
| 2,705,655 A * | 4/1955 | Flemming | ................ | C25F 3/20 277/640 |
| 3,381,988 A * | 5/1968 | Dewar | .................... | B60R 13/06 277/642 |
| 3,763,595 A * | 10/1973 | Sudyk | .................. | E06B 7/2309 49/489.1 |
| 3,883,993 A * | 5/1975 | Pullan | ..................... | B60J 10/24 49/490.1 |
| 4,232,081 A * | 11/1980 | Pullan | ..................... | B60J 10/24 428/122 |
| 4,991,352 A * | 2/1991 | Hyer | ..................... | E06B 7/2309 49/489.1 |
| 5,011,163 A * | 4/1991 | Hermann | ................ | E06B 5/164 277/645 |
| 6,126,173 A * | 10/2000 | Westhoff | .................. | F16L 5/10 277/615 |
| 6,286,888 B1 * | 9/2001 | Essig | ....................... | B60J 7/104 160/382 |
| 6,287,669 B1 * | 9/2001 | George | .................. | B60R 13/04 277/644 |
| 6,336,640 B1 * | 1/2002 | Knapp | ............... | F16L 25/0054 277/606 |

(Continued)

*Primary Examiner* — Justin B Rephann
(74) *Attorney, Agent, or Firm* — Paul B. Heynssens Attorney at Law, PLC

(57) ABSTRACT

A tailgate seal with taper seal. The tailgate seal with taper seal provides a seal for pickup truck beds with covers to prevent infiltration of dirt, rain, snow, and the like from infiltrating into the truck bed, thereby protecting cargo from damage. The tailgate seal with taper seal can be produced in a variety of sizes depending on the width of the gap to be sealed, and is easily installed by the end user.

12 Claims, 6 Drawing Sheets

(56) References Cited

U.S. PATENT DOCUMENTS

| | | | | |
|---|---|---|---|---|
| 6,474,654 B1* | 11/2002 | Schmeichel | ........... | B60J 10/248 277/630 |
| 6,485,030 B1* | 11/2002 | Hahn | ................ | B60J 10/82 277/644 |
| 6,773,019 B2* | 8/2004 | Schmeichel | ........... | B60J 10/248 277/630 |
| 6,959,848 B2* | 11/2005 | Schmeichel | ........... | B60J 10/248 226/50 |
| 7,182,384 B2* | 2/2007 | Schmeichel | ........... | B60J 10/248 296/57.1 |
| 8,002,359 B2* | 8/2011 | Dormaier | ................ | B60R 13/06 277/590 |
| 2003/0121211 A1* | 7/2003 | Hashimoto | ............. | B60J 10/24 49/490.1 |
| 2005/0064135 A1* | 3/2005 | Perrin | ................ | B60J 10/24 428/122 |
| 2006/0143988 A1* | 7/2006 | Dillmann | ............... | B62D 25/12 49/498.1 |

* cited by examiner

TAILGATE SEAL FOR A PICKUP WITH A TRUCK CAP OR COVER

CROSS-REFERENCE TO RELATED APPLICATION

This application is a continuation in part of U.S. patent application Ser. No. 14/705,839 filed May 6, 2015, which in turn claims the benefit of U.S. Provisional Patent Application No. 61/992,898, filed May 14, 2014, the disclosure of which is incorporated herein by reference.

TECHNICAL FIELD

This description relates generally to sealing the bed of pickup trucks.

BACKGROUND

The bed of pickup trucks is often lined with spray on coatings to protect the metal surface from scratches and to protect the cargo from damage. Additionally, some truck beds are covered with a flexible or ridged cap, or tonneau cover. This cap or cover also protects the cargo from environmental damage and theft.

Pickup truck tailgates, as typically provided by the manufacturers, have no gasket or seal around the perimeter of the tailgate. Lack of a gasket or seal on the tailgate allows dust, rain, and fumes to penetrate into the interior of the pickup truck bed, potentially damaging the cargo and decreasing the protective effect provided by the cap or cover.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified for as a prelude to the more detailed description that is presented later.

The present example provides a tailgate seal with a taper seal for use at the tailgate of pickup trucks or other similar openings. The tailgate seal is provided with a self adhesive component for attachment to the vehicle, and can be provided with differing length dimensions for sealing openings with various lengths.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a tailgate seal with taper seal. Although the present examples are described and illustrated herein as being implemented in a pickup truck bed, the system described is provided as an example and not a limitation. As those skilled in the art will appreciate, the present examples are suitable for application in a variety of different types of orifice sealing applications.

The tailgate seal with taper seal provides a seal that prevents the infiltration of dirt, rain, fumes, and the like from penetrating into a vehicle. The taper seal portion of the tailgate seal allows for use of one material where the gap to be sealed may be of a multitude of widths. Although dimensions are shown in some of the figures that follow, they are meant to be exemplary and are not intended to be a limitation.

Figure 1:
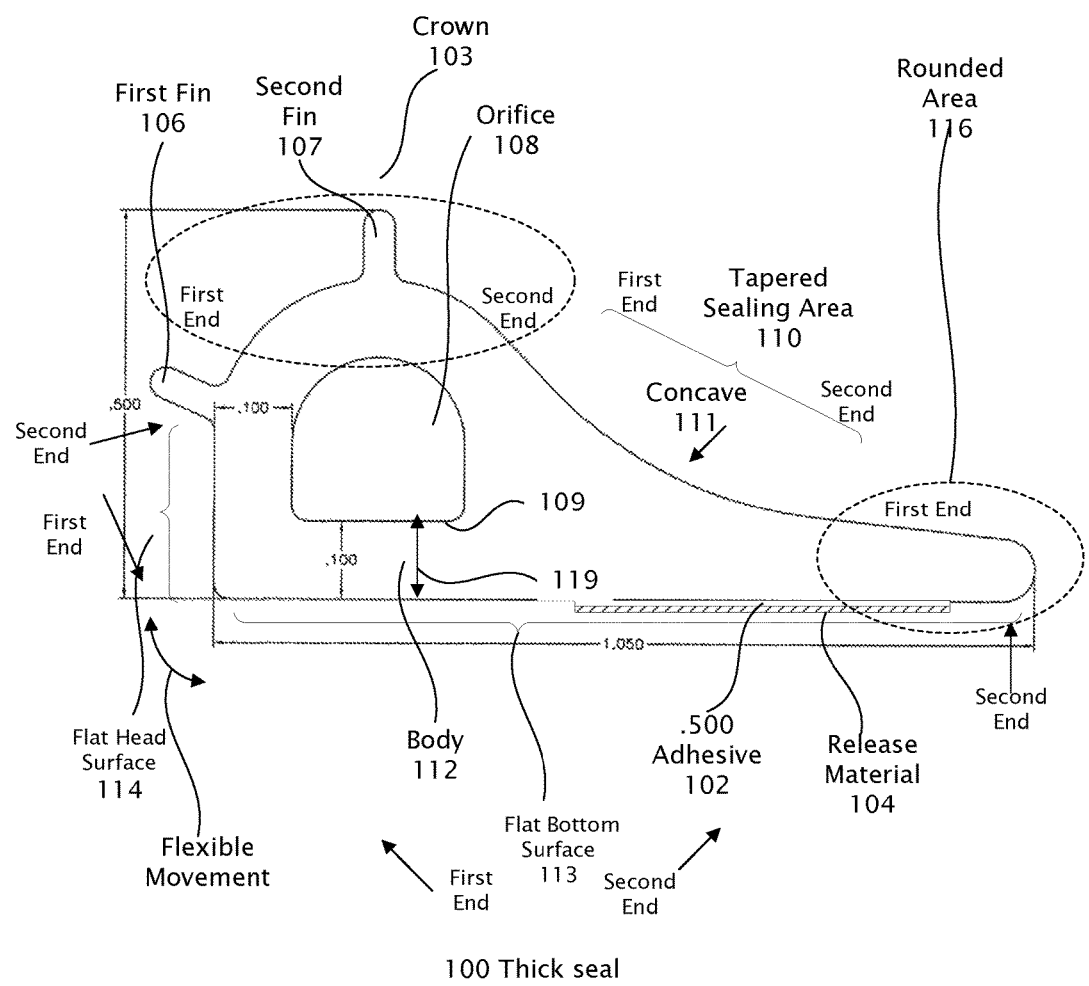
FIG. 1 shows a thick tailgate seal with taper seal.

FIG. 1 shows a cross section of thick tailgate seal with taper seal 100. The tailgate seal is comprised of an elongate body 112 typically made from an elastomer such as silicone, EPDM (ethylene propylene diene monomer) rubber or the like. The seal is typically formed in a long piece with right angle extensions to fit the space between the sides of a tailgate and the longer bottom surface where the hinge may be located.

The body 112 has a tapered sealing area 110 that provides a reduced thickness for improved sealing of gaps of various widths, while allowing for easier closure of the tail gate due to removal of excess material which would cause resistance to closure of the gate. In particular the tapered sealing area has a concave, or dished out surface 111, that advantageously provides an improved seal while reducing the bulk of the seal over those that are not provided with such curvature. Previous seals may have attempted to ease closure by the use of additional voids in the tapered sealing area. However by providing a concave surface the need for such additional voids, that may be subject to breakthrough and rupture with extended use is removed.

The body 112 also has a hollow orifice 108, which allows compression and recovery of the tailgate seal. The orifice shown has a "D" shape, with the flat of the "D" substantially parallel to a flat bottom surface 113, and with the curved portion of the "D" generally matching the curvature of an exterior crown area 103.

The body includes a flat bottom surface 113 that fits against the truck frame. At a second end there is a rounded area 116 where the concave area of the tapered sealing area abuts the flat bottom surface. Because of the absence of voids this rounded area may be be extended out providing more material to maintain the seal. The rounded area has a convex shape as it transitions from the tapered sealing area to the flat bottom surface.

At a first end of the flat bottom surface a first end of the flat head surface 114 is encountered. The flat head surface is generally perpendicular to the flat bottom surface, and extends to a second end of the flat head surface. At the second end of the flat head surface transitions to a first end of a crown area 103. At this juncture a first fin 106 is formed to aid in sealing the gate against the bed surface.

An adhesive strip 102, typically protected by a release material 104 is disposed adjacent to the second end of the flat bottom surface. The adhesive does not extend over the entire flat bottom surface because it has been found that by using substantially 50% coverage the first end of the flat bottom surface may flex during use, providing a better seal.

The crown area 103 is generally convex and includes a second fin 107 that is generally oriented vertically and is located at the peak of the crown. This second fin is substantially oriented at a right angle to the first fin so that seals against two different surfaces (not in the same plane) in the jamb of the tail gate and bed are sealed. It is worth pointing out that the first and second fins seal different areas of the truck body, which is why they are spaced at substantially right angles from each other, and which is why they are not closely spaced together as if they were constructed to seal against a single planar surface.

A second end of the crown area 103 transitions from a convex curve to a concave curve at a first end of the tapered sealing area 110. A second end of the tapered sealing area transitions to the convex curvature encountered at a first end of the rounded area 116, and finally a second end of the rounded area transitions into the second end of the flat bottom surface 113.

Fins 106, 107 are provided to aid the seal gaps between a tailgate and a truck bed differing surfaces (at differing angles). In one example, the seal body 112 has a flat bottom body surface 113 and a flat head surface 114 generally perpendicular to the flat bottom surface 113. The orifice 108 has a flat bottom orifice surface 109 parallel to the surface 113 with a distance 119 between the flat bottom orifice surface 109 and the flat bottom body surface 113. The tapered sealing area 110 comprises a tail section, or rounded area, 116 with a thickness less than the distance 119. In another example, the seal body 112 further includes a plurality of fins 106 extending from the flat head surface 114 and extending upward from the orifice area respectively.

The tailgate seal is provided with a self-adhesive layer 102 on the flat bottom body surface 113 which maintains the tailgate seal in opposition to the truck body. To protect the adhesive, it is covered with a release material 104 which is removed for installation of the tailgate seal. The self-adhesive layer 102 may have various widths. In one example, the self-adhesive layer 102 is only provided within the tapered sealing area 110 for the thick tailgate seal, which allows flexible movement of the tailgate seal around the orifice 108.

Figure 2:
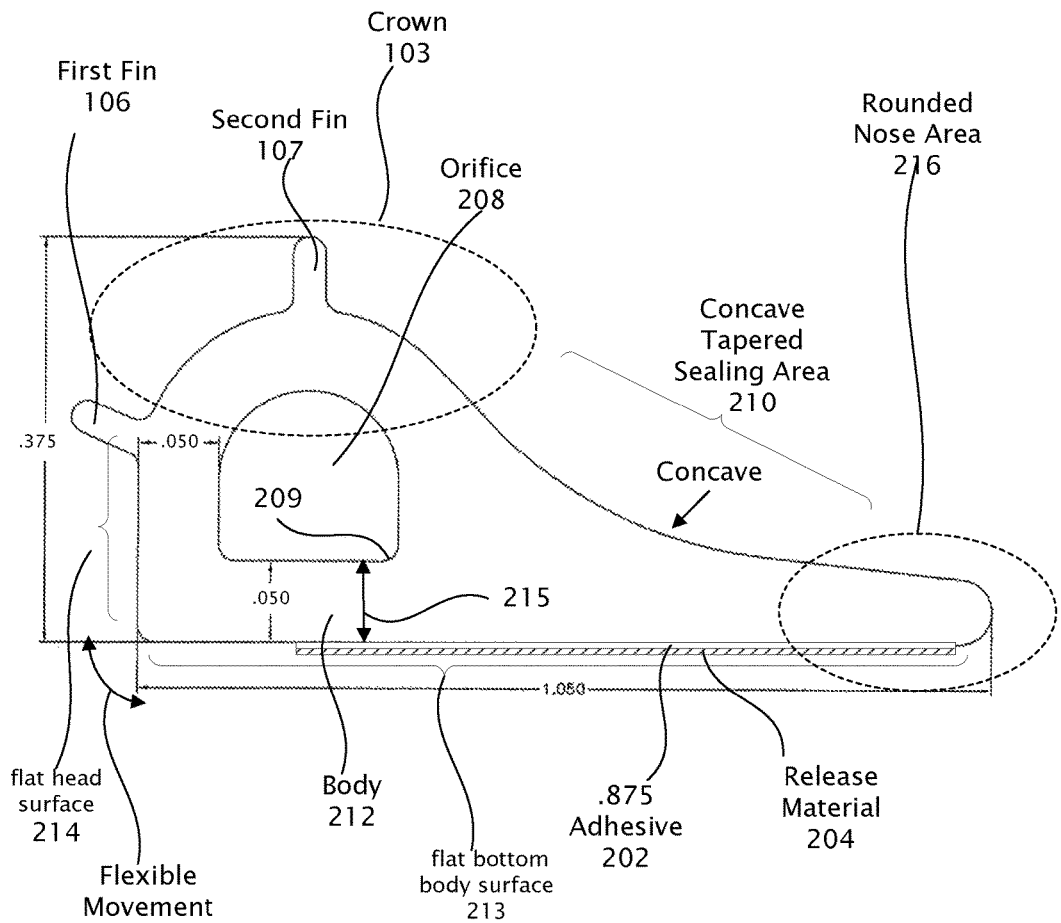
FIG. 2 shows a thin tailgate seal with taper seal.

FIG. 2 shows a cross section of thin tailgate seal with taper seal 200. It is proportioned as described in FIG. 1. The tailgate seal in this figure provides similar attributes as that shown in FIG. 1, but is provided with different dimensions. This thinner tailgate seal 200 is provided with a tapered sealing area 210, an orifice 208, fins 206, a self-adhesive layer 202 covered with a release material 204. Although dimensions are shown in FIG. 1 and FIG. 2, these are meant to be exemplary and not limiting. Those skilled in the art will recognize that the present examples are suitable for application in a variety of different types of orifice or opening sealing applications. The aforementioned mention structure in FIG. 1 may also be applicable to FIG. 2. For example, the seal body 212 has a flat bottom body surface 213 and a flat head surface 214 perpendicular to the flat bottom surface 213. The orifice 208 has a flat bottom orifice surface 209 parallel to the surface 213 with a distance 215 between the flat bottom orifice surface 209 and the flat bottom body surface 213. The tapered sealing area 210 comprises a tail section 216 with a thickness less than the distance 215. In another embodiment, the seal body 212 further comprises a plurality of fins 206 extending from the flat head surface 214 and extending upward from the orifice area respectively. The self-adhesive layer 202 may have various widths. In one embodiment, the self-adhesive layer 202 extends beyond the tapered sealing area 210 to cover at least some of the flat bottom body surface 213 in proximity of the orifice 208.

Figure 3:
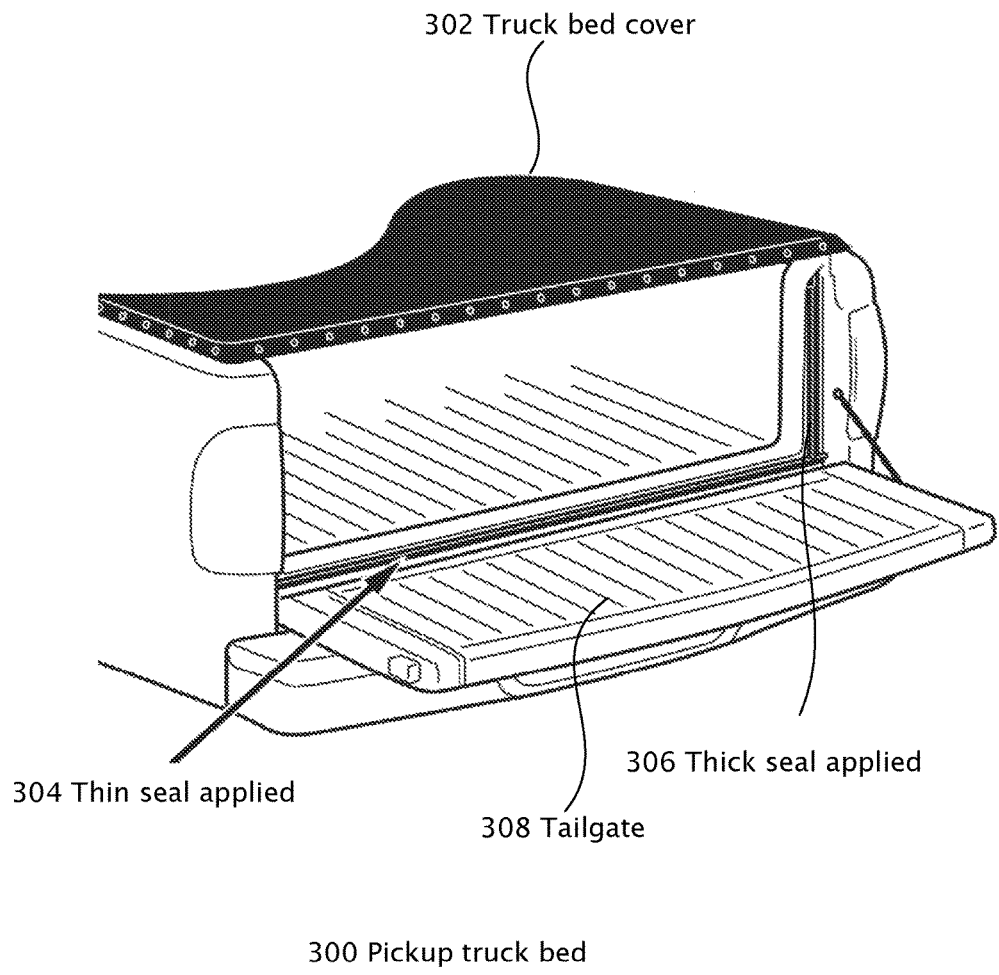
FIG. 3 shows a pickup truck bed with the thick and thin seal applied.

FIG. 3 shows a pickup truck bed with the seal applied. The tailgate seal 304 and 306 is applied to the three sides of the pickup truck bed where the tailgate 308 meets the truck bed. When the tailgate 308 is closed, the tailgate seal 304 and 306 seal any gap between the tailgate 308 and truck bed. In one embodiment, the tailgate seal 304 and 306 have the same dimension. In another embodiment, the tailgate seal 304 and 306 have different dimensions.

Figure 4:
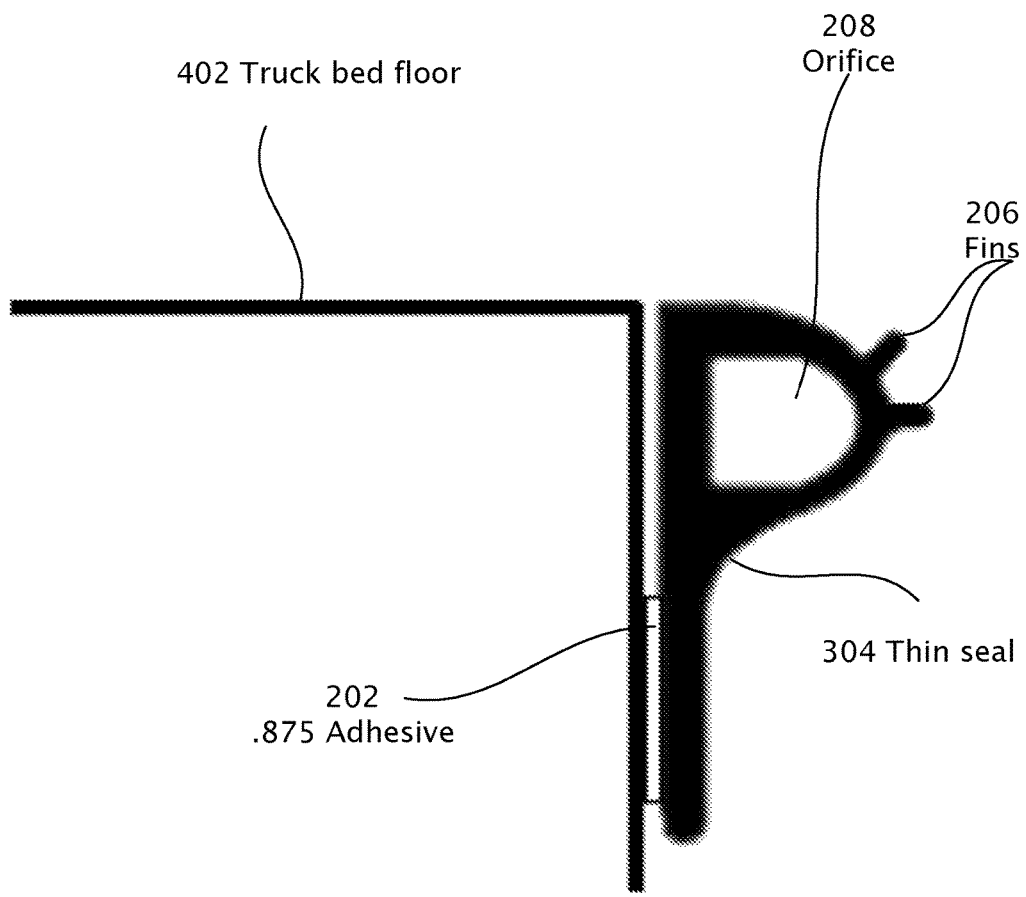
FIG. 4 shows the thin seal applied at the truck bed floor.

FIG. 4 shows the thin seal applied at the truck bed floor. The tailgate seal 304 is applied at the edge of the truck bed floor with the edge of the tailgate seal with the orifice 208 and fins 206 closest to the truck bed floor. In one embodiment, the flat head surface 214 is flush with truck bed floor surface 402 for a flat surface. Although the thin seal applied at the truck bed floor as shown I FIG. 4, it is understood that the thick seal may also be applied at the truck bed floor.

Figure 5:
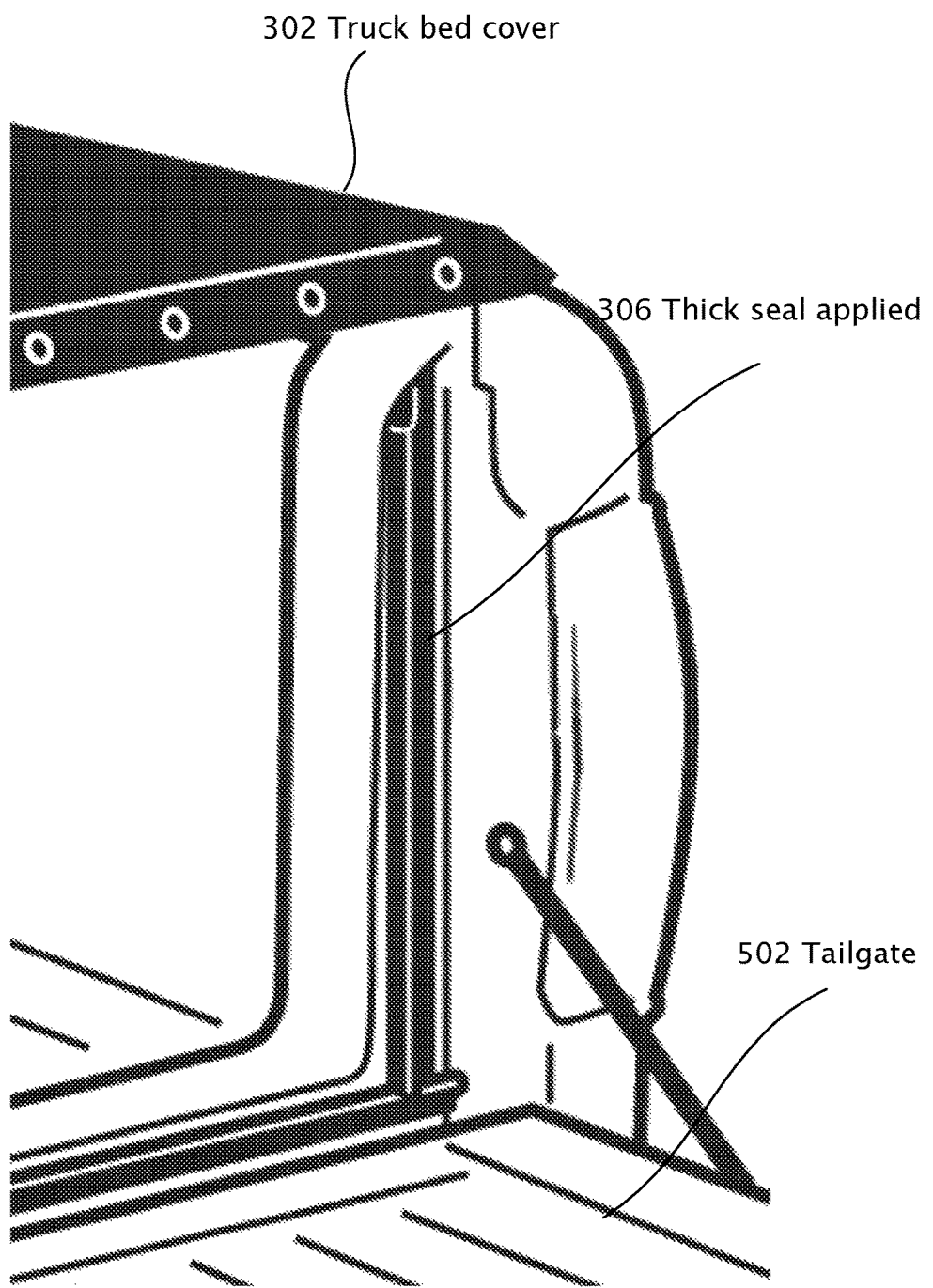
FIG. 5 shows the thick seal applied at the sides of the truck bed.

FIG. 5 shows the thick seal 306 applied at the sides of the truck bed. The application is similar to that shown in FIG. 4 in that the orifice and fins (not shown) are placed closest to the truck bed opening.

Figure 6:
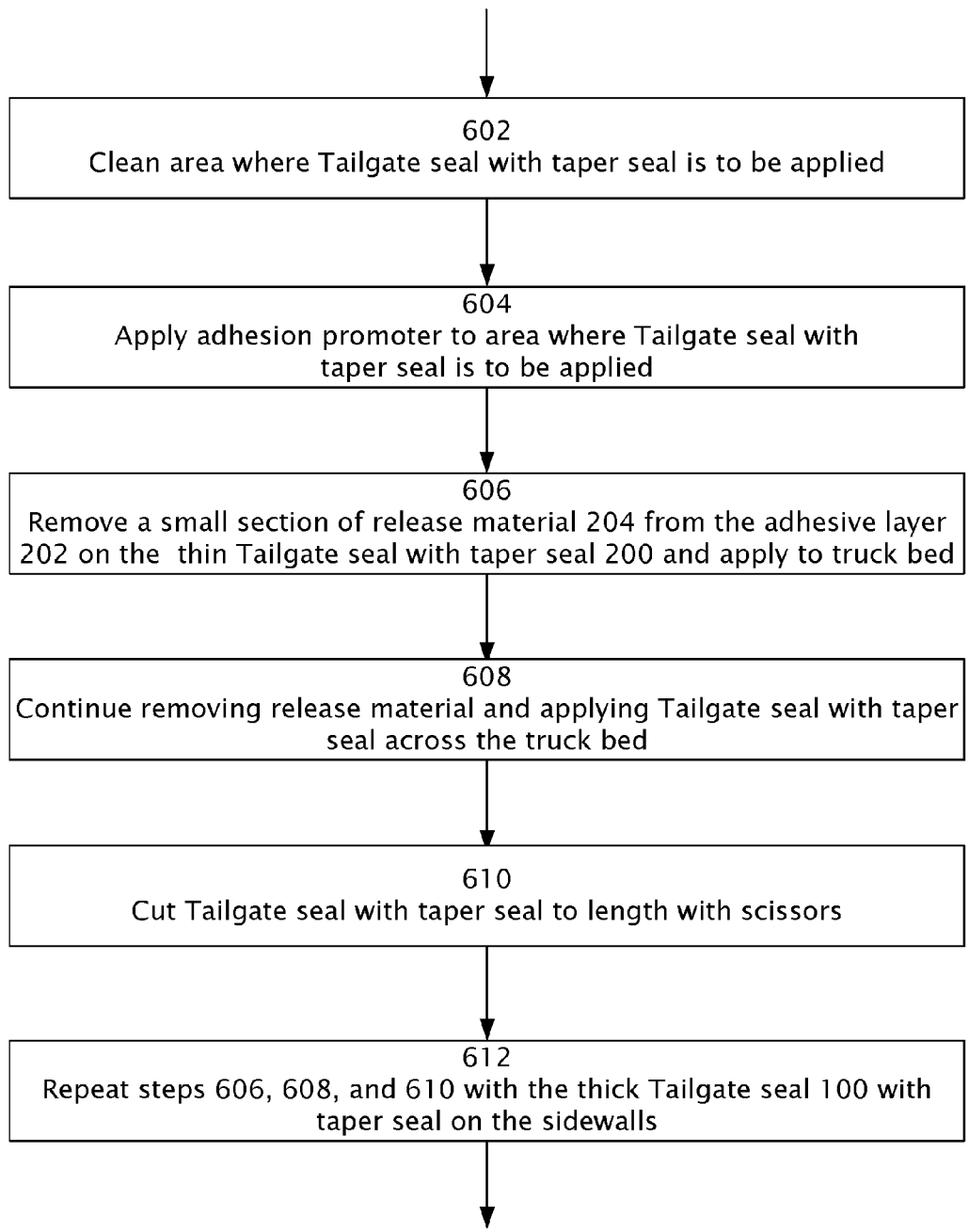
FIG. 6 shows a flow diagram outlining the installation of the tailgate seals with taper seal.

FIG. 6 shows a flow diagram outlining the installation of the tailgate seals with taper seal. At block 602, the area where the tailgate seal with taper seal 100 and 200 are to be applied is cleaned with soap and water and dried. Once dry, the areas are cleaned with isopropyl alcohol and allowed to dry. At block 604, an adhesion promoter may optionally be applied to the areas where the tailgate seal with taper seal is applied. An adhesion promoter is typically not needed for a painted surface, but may help when installing a tailgate seal to a spray liner. At block 606, a small portion of the release material 204 is removed from the adhesive 202 and the tailgate seal applied to the truck bed starting at one end. At block 608, the process of removing a small section of release material from the adhesive layer is continued across the floor of the truck bed. At block 610, the tailgate seal is cut with scissors.

At block 612, the tailgate seal 100 is applied to the sides of the tailgate opening, beginning at the bottom of the opening, progressing up the side wall to the top of the opening, then cutting the tailgate seal with scissors to fit. This block is repeated on the opposite side of the tailgate opening.

It will be obvious to those skilled in the art to make various changes, alterations and modifications to the invention described herein. To the extent such changes, alterations and modifications do not depart from the spirit and scope of the appended claims; they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A tailgate seal comprising:
a seal body with an outer surface including:
a flat bottom body surface, having a first end and a second end;
a flat head surface having a first end and a second end, and including a first fin of non-perpendicular orientation, the flat head surface perpendicular to the flat bottom body surface where the first end of the flat head surface abuts the first end of the flat bottom surface, and the first fin of non-perpendicular orientation disposed along the flat head surface at the second end of the flat head surface;
a crown section having a first end and a second end, and including a second fin extending vertically from a peak of the crown section, the first end of the crown section abutting the first fin of non-perpendicular orientation and the second end of the flat head surface;
a tapered sealing area including a first end and a second end, and including a concave surface extending between the tapered sealing area first and second ends, the tapered sealing area first end abutting the second end of the crown section; and
a rounded area having a first end and a second end, the second end of the tapered sealing area abutting the first end of the rounded area, and second end of the rounded area abutting the second end of the flat bottom surface, whereby the tapered sealing area provides a non-linear varied thickness from the second end of the crown to the first end of the rounded area;
a single "D" shaped orifice disposed within the seal body, having a flat side of the "D" shape orientated parallel to the flat bottom body surface; and
an adhesive layer disposed on the flat bottom body surface for coupling the seal body to a truck body.

2. The tailgate seal of claim 1, wherein the tailgate seal further comprises a removable release material covering the adhesive.

3. The tailgate seal of claim 1, wherein the rounded area has a thickness less than the distance between the flat side of the "D" shaped orifice surface and the flat bottom body surface.

4. The tailgate seal of claim 1, wherein the tailgate seal is made from silicone or EPDM (ethylene propylene diene monomer) rubber.

5. The tailgate seal of claim 1, in which the crown section transitions from a convex curve to a concave curve at the first end of the tapered sealing area.

6. The tailgate seal of claim 1, in which the second end of the tapered sealing area transitions to a convex curvature encountered at a first end of the rounded area.

7. The tailgate seal of claim 1, in which the adhesive layer extends from the second end of the flat bottom surface to a distance midway to the first end of the flat bottom surface.

8. The tailgate seal of claim 1, in which the crown section is convex.

9. The tailgate seal of claim 1, further comprising a plurality of fins on the flat head surface.

10. The tailgate seal of claim 1, in which the tapered sealing area has a recessed shape.

11. A tailgate seal comprising:
a seal body including:
a flat bottom body surface having a first end and a second end,
a flat head surface including a first end, a second end and a first fin, the first end of the flat head surface adjacent to the first end of the flat bottom body surface, the flat head surface disposed perpendicular to the flat bottom body surface, the first fin disposed at the second end, the first fin disposed at a second end of the flat head surface,
a crown having a first end, a second end, and a second fin at an apex of the crown, such that the second fin is in vertical orientation to the flat bottom surface,
a concave tapered sealing area having a first end and a second end, in which the second end of the crown abuts the first end of the concave tapered sealing area, the second end of the concave tapered sealing area abutting a rounded area at a first end, and the rounded area having a second end abutting the second end of the flat bottom surface;
a "D" shaped orifice disposed within the seal body for allowing compression and recovery of the tailgate seal, the orifice having a flat bottom orifice surface parallel to the flat bottom body surface;
and
whereby the concave tapered sealing area provides a varied non-linear decreasing thickness from a maximum height of the seal body to a portion of the rounded area disposed farthest from the flat head surface.

12. The tailgate seal of claim 11 wherein the rounded area has a thickness from the rounded area first end to the flat bottom surface less than the distance between the flat bottom orifice surface and the flat bottom body surface.

* * * * *